INVENTORS
DONALD P. MANNING
LLOYD D. CAISON
FRANK R. JONES

BY Richard H. Anderson
ATTORNEY

INVENTORS
DONALD P. MANNING
LLOYD D. CAISON
FRANK R. JONES

BY Richard A. Anderson
ATTORNEY

United States Patent Office 3,767,754
Patented Oct. 23, 1973

3,767,754
METHOD FOR MELTING AND DISPERSION OF THERMOPLASTIC POLYMERS
Donald P. Manning, Colonial Heights, Lloyd D. Caison, Hopewell, and Frank R. Jones, Chester, Va., assignors to Allied Chemical Corporation, New York, N.Y.
Original application Nov. 15, 1968, Ser. No. 776,092, now Patent No. 3,596,320. Divided and this application Mar. 8, 1971, Ser. No. 122,120
Int. Cl. B28b 3/22
U.S. Cl. 264—176                                    6 Claims

ABSTRACT OF THE DISCLOSURE

An improved method for uniformly mixing polymer materials and additives wherein one constituent may be a low viscosity component and the other a viscous polymer mixed by passage through an extruder having the overall length comprised of a feed zone 10–20 percent; a transition zone 27–40 percent and a metering zone of 45–60 percent. Within said metering zone there are 2–6 flight interruptions, said method of mixing polymers producing an extrudate with a coefficient of particle variation of less than 30 percent and said polyblends and low viscosity materials incorporated in polymers being both suitable for piece dyeing when converted into textile articles.

---

This is a divisional of application Ser. No. 776,092 filed Nov. 15, 1968, now Pat. No. 3,596,320.

BACKGROUND OF THE INVENTION

The field of masticating and blending of various polymers for plastics and films has been the source of extensive study. In addition, various mixing rings and interrupted flight devices have been the source of extensive past and continued development. From the continued number of extruder and process modifications which continue to be published, it seems clear that many of these problems remain relatively unresolved even in the field of coarse plastics which require generally significantly less control than that required for production of synthetic fibers.

In the production of plastics and films, particularly where mixing and mastication devices have been employed, fairly extensive pressure and thermal variations have occurred with short extruders having barrel lengths 15 to 20 times the diameter. One approach which has been proposed to overcome these problems has been to increase the length/diameter ratio of extruders in the region of 20–30 which results in some increase in the length of the metering zone. While this is of some value in decreasing the extent of the extruder fluctuations, there remains a degree of pressure and temperature fluctuation which is undesirable for producing coarse plastics and films and even less desirable for the production of synthetic fibers.

There is still another problem in the prior art where one mixes a low viscosity material with a high viscosity polymer. Because of the tendency of these materials to establish a flow in which a velocity gradient is present along the extruder, there is separation of the low viscosity component from the high viscosity component rather than achieving the desired blending and mixing so as to produce a homogeneous mixture of uniform physical characteristics. Thus, despite the extensive studies which have heretofore been reported in the prior art, none of the proposals thus far have resolved the problem related to efficient blending and mixing of two polymers of which one is insoluble in the other. Moreover, none of the proposals have resolved process technology suitable for fiber application; and more particularly, the problem of dispersion of low viscosity materials such as antistatic agents or antisoiling agents in a high viscosity polymer.

With the foregoing discussion in mind, a method for overcoming the problem involved in dispersing two polymers within each other uniformly which may not have similar viscosities using an extruder of 15–20 length/diameter ratio without temperature and pressure fluctuations represents a substantial improvement in the spinning of synthetic fibers and particularly blends of synthetic fibers.

SUMMARY OF THE INVENTION

In accordance with the present invention a method is provided for simultaneous dispersion and mixing of thermoplastic polymers, where one or more components having a melt viscosity of at least 300 poises measured at 275° C. and 3,000 reciprocal seconds, by passage of the admixed polymer pellets into a heated extruder having three zones: a feed zone, a transition zone, and a metering zone. The metering zone is preferably longer than the other zones combined. These three zones as percent of the total extruder screw length are: the feed zone 10–20 percent, the transition zone of 27–40 percent, and the metering zone 45–60 percent. Within the metering zone, there are 2 to 6 flight interruptions which have a length/extruder diameter ratio of between 0.11 and 0.36. The repetitive change in direction of the general flow within the extruder imposed by flow around the leading edge of each flight interruption (having a tip radius of between 0.5 and 1.1) results in significantly improved mixing without undesired extruder pressure variations.

The use of a shallow lead distance/extruder diameter ratio of between 0.65 and 1.1 is a necessary factor in keeping temperature and pressure fluctuations low. By using a normal rotational speed of the extruder (particularly below that where the mechanical heat input is less that that required to achieve the desired temperatures and using an apparent shear rate of between 280 and 400 reciprocal seconds) excellent dispersion of insoluble polymers can be obtained. This invention is particularly appropriate for dispersion of polymer types disclosed in U.S. Pat. 3,369,057 dated Feb. 13, 1968.

In admixing a low viscosity material with a high viscosity polymer, by prior art procedures, there normally occur dead spaces and separation of the two components between the first flight and the feed seal wall. Additionally, in the transition zone against the flight sections facing the feed zone, there is obvious and large segregation of the low and high viscosity components. This segregation results in differential residence within the screw which in turn invites formation of gels and additionally fails to achieve the desired uniformity of product at the discharge point. The first problem has been overcome by separation of the first flight from theh extruder seal wall. The second problem is eliminated by providing a low angle ramp deviating by 1 to 2 degrees from the normal taper within the transition zone. This ramp in combination with the transition zone flights toward the feed end has a radius of curvature/screw diameter ratio which is between 0.035 and 0.0715 and the radius of curvature of the flights in direction of the metering zone are one-half this value. This structure eliminates the aforesaid described stagnant and separation zones within the extruder without significant reduction in the extruder output and further without decreasing the excellent temperature uniformity and low pressure variation which has been described for the improved mixing screw of this invention.

Thermoplastics, in general, can be melted and extruded utilizing the improved extrusion method and apparatus of this invention. Such thermoplastics are polyolefins, polyamides, polyesters, polyacrylics, polyphenylenes, polycarbonates, thermoplastic polyureas, polyvinyl chloride, and the like. However, because of their excellent dyeing and textile properties, the preferred polymers to be blended are polyamides such as polycaproamides (nylon 6), polyhexamethylene adipamides (nylon 6,6), and alicyclic-aliphatic polyamides made by condensation of bis(para-aminocyclohexyl)methane with dibasic acids such as azaleic acid, dedecanedioic acid to produce such polyamides as poly[bis(p-aminocyclohexyl)methane azelamide] and poly[bis(para-aminocyclohexyl)methane dodecamide]. Other useful polyamides are copolymers of polycaproamide with the lactam of hexahydroamino-benzoic acid. These polyamides may be utilized by blending with a polyester such as polyethylene terephthalate or alternately, by blending low viscosity components with these polyamides.

The process and apparatus of this invention have been highly satisfactory for blending a polyethylene glycol and other components such as antisats and antisoiling agents in the amount of about 2 to 5 percent by weight of a polyamide. For example, 4,4'-butylidene bis(6 tertiary butyl-m-cresol) may be blended in the amount of about 0.2 to 1.0 percent by weight of polyamide as an effective antisoiling agent as well as an antistatic agent. Other low viscosity materials which may be dispersed are oil extending agents, pigments dispersed in oil extending agents, and heat and light stabilizing agents. Such extending agents are particularly of value in the polyamides already discussed.

DESCRIPTION OF THE PREFERRED EMBODIMENTS

Figure 1:
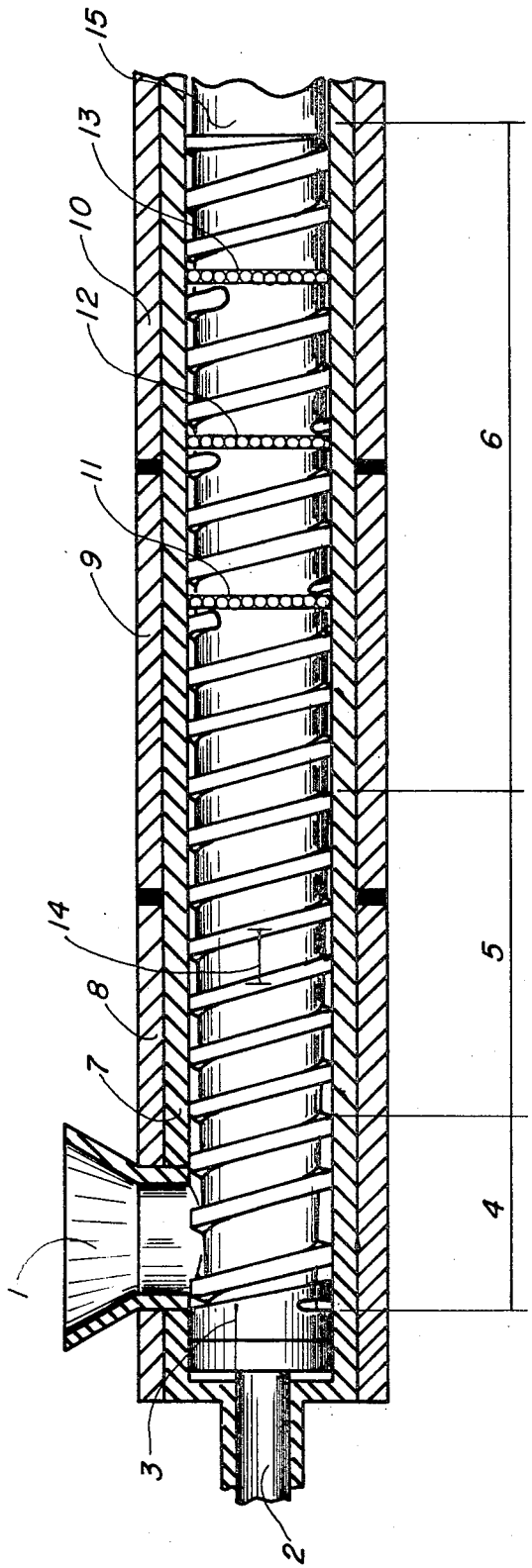
FIG. 1 is a schematic illustration of the mixing screw of the present invention. It illustrates the relative size of the three zones: a feed zone of 10–20 percent, a transition zone of 27–40 percent, and a metering zone of 45–60 percent comprising the total length. Flight interruptions in the metering zone are shown which are especially useful for mixing of insoluble polymers with each other.

One embodiment of this invention is illustrated by FIG. 1 wherein three mixing zones are shown as follows: feed zone 4, 10–20 percent of the length; transition zone 5, 27–40 percent of the total length; and metering zone 6, 45–60 percent of the total length. This applies to a mixing screw with a length 15 to 20 times greater than its diameter. If a mixing screw is employed which is 24–30 times greater, than its diameter these zones as percent of the total length are: feed zone 4, 6–14 percent; transition zone 5, 18–40 percent; and metering zone 6, 42–68 percent of the total length.

The specific embodiment illustrated has a screw diameter of 3.5 inches diameter and a length of 60 inches for a length/diameter ratio of 17.2. The feed zone 4 is 8.4 inches, or 14 percent of the length; the transition zone, zone 5, is 20 inches in length or 33 percent of the total length; and, the metering zone 6 is 32.3 inches in length or 53 percent of the total length.

In extruders employed in the past, the feed zone is significantly longer and the metering zone is significantly shorter than the respective zones employed in the present invention. We have found that the above relative zone lengths are essentially to produce a uniformly metered, and mixed polymer at uniform temperature and pressure control. In operation, blended polymer chips pass through hopper 1, contacting the feed zone 4 and pass by the force exerted int he rotation of the screw from shaft 2, by a motor not shown, towards the transition zone. Heat applied by zone electric heater 8 transmits heat via barrel 7 to the polymer chips. Transition zone 5 and metering zone 6 are heated by electric heater 9, and an electric heater 10 is employed at the end of the metering zone.

The screw flight depth in the feed zone is about 0.37 inch. A greater depth would require too rapid a transition and would cause pressure fluctuation. A lesser feed flight depth would result in reduced conveying capacity. Because of the short feed zone length compression in this zone is required. However, in the transition zone 5 compression at constant taper occurs equal to a 3.5 compression ratio. At higher compression ratios, above 4.0, substantial pressure fluctuation occurs. At compression ratios below 2.9 highly objectionable temperature and pressure fluctuation occur. In this invention the distance between flights or lead distance 14 is generally narrower than that employed in past procedures and is 2¾ inches or 0.81 of the diameter.

The polymer becomes molten in the transition zone; therefore, at the compression ratios employed, released gasses are compressed and discharged out the opening of hopper 1. The polymer then passes in to the metering zone 5 where the full effect of shear and mixing must occur. In addition, such mixing must be smooth and uniform without pressure fluctuation. It has been found that mixing immiscible polymers can be best accomplished by a small thread height 0.100 to 0.125 inch in the metering zone. This in conjunction with a narrow lead between the flight channels results in a fluid profile moving at a velocity at least 0.9 and preferably at least 0.3 the rotational velocity of the interrupted flight sections 11, 12, and 13. At lower laminar velocities, the coefficient of the disperse phase particle size variation is greater and the quality of the fibers and resultant fabrics made from polymers under such conditions is less uniform.

The screw flight height/screw diameter ($h/d$) ratio in the metering section should be 0.0025 to 0.0035. At a reduced value too much mechanical heat is generated to achieve the desired reduction in particle size and at a higher value than 0.0035 the necessary particle size reduction and mixing action is not achieved.

The length of flight interruption sections 11, 12 and 13 as measured from the flight edge to flight edge on a straight line axial with the extruder barrel divided by the extruder diameter has a value of between 0.105 to 0.36 and preferably between 0.14 to 0.286. Preferably this distance, for mixing extruders of 2 to 4 inches in diameter, is between 0.375 to 1.0 inch. At a reduced distance, erratic flows and pressures are experienced. At a greater distance of flight interruption a larger portion of the laminar flow passes on the downstream side of the flight edge and does not receive a shear rate or mixing action characteristic of that when it passes on the upstream side of the flight section as indicated in the flow patterns in FIG. 3. We have discovered that for a 3.5 inch extruder, this distance is about 0.75 inch.

The tip radius of the flight edge for 3.5 inch extruders is 0.8 inch and preferably should be between 0.7 to 0.9 inch. It also may be in the range of 0.5 to 1.15 inch. A reduced tip radius value does not achieve a desired degree of particle acceleration and sufficient mixing and shearing of dispersed particles are not obtained. At a larger tip radius (indicative of a blunt edge) at the downstream point of contact of fluid with the interrupted flight section there is less satisfactory extruder pressure control.

Mixing rings as indicated may be present. The absence of mixing rings is not essential for effective mixing.

The mixed polymers are discharged at 14 at low temperature fluctuations, generally less than ±3° C.; and at low extruder pressure fluctuations, generally less than 150 p.s.i. Extruders which employ a mixing ring interrupted by continuous flight give large and variable pressure fluctuations which are indicative of the importance of the interrupted flights in admixing polymers.

In the mixing of low viscosity components of less than 20 poises with a high viscosity polymer generally greater than 200 poises as measured at 275° C. and 3000 reciprocal seconds shear rate there is a tendency of the low viscosity component to separate behind the initial flight section and toward the upstream section between the flights. The more viscous components move downstream towards the opposite flight on the downstream side of the flight. Such flow patterns result in a non-uniform mixture. If the low viscosity components affect the dyeability, then non-uniform dyeable products result that are unsuitable for piece dyeing.

Figure 2:
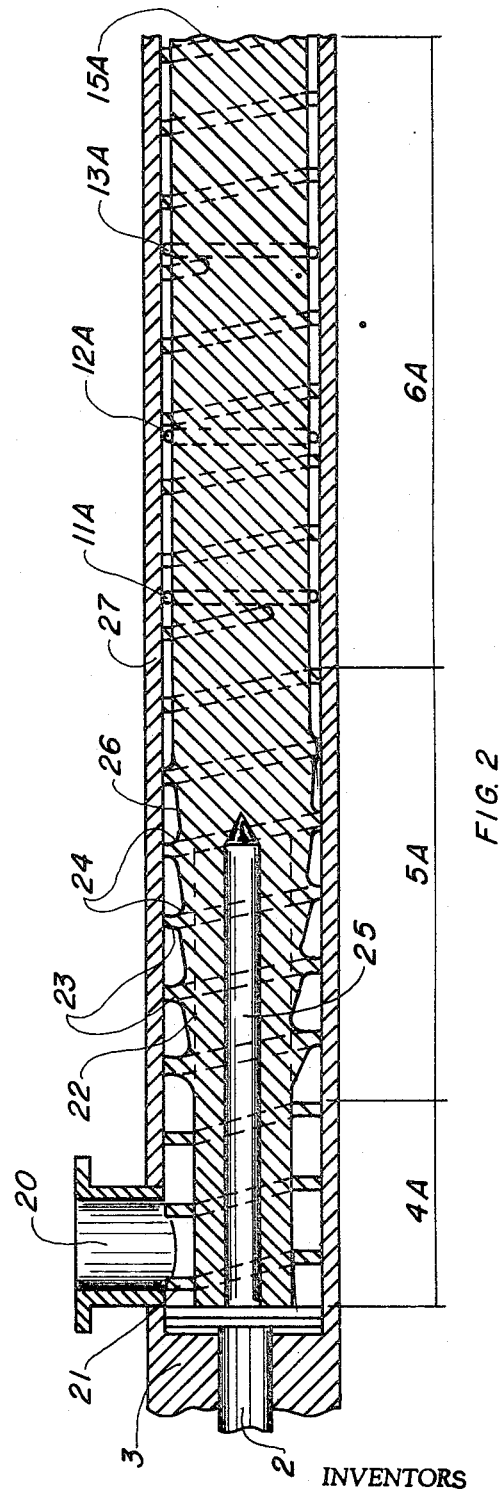
FIG. 2 illustrates a cross sectional drawing of the same apparatus but with modifications necessary to admix a low viscosity component with a high viscosity component by use of low taper step-ramps and curved flights which improve the uniformity of mixing and subsequent ability to convert fibers to fabrics which have uniform piece dyeability.

FIG. 2 illustrates an axial section of the preferred modification of a mixing extruder for mixing a low viscosity modification agent with a high viscosity polymer. The high viscosity polymer enters at hopper 20 and advances along the extruder barrel 27. The low viscosity component may be combined with the high viscosity component through hopper 20 or at a selected point along the extruder barrel 27 by conventional metering means, not shown. Preferably, this component is introduced just downstream of the second screw flight.

This molten stream is coated onto the polymer by the rotational action of flights within extruder barrel 27 impelled by a motor, not shown, at shaft 2. The liquid applied moves back toward seal wall 3 and since the flight is separated from the seal wall at 21, the portion of low viscosity component which has moved backward moves forward and again admixes with the forward flow stream. Thus, the stagnant areas normally found behind a flight section where they are connected as a continuous or solid flight with the seal wall is avoided. The dimensions of the feed zone 4A, transition zone 5A, and the metering zone 6A correspond with that already discussed for zones 4, 5 and 6. In the transition zone 5A a series of step ramps 22 rise 1°24' from the normal transition zone taper of 55 minutes. If a larger step ramp taper is employed, say 4-5°, the extruder exhibits high pressure fluctuation greater than ±500 p.s.i. At a reduced taper in the step ramps (below 30') from the normal taper, separation of the low viscosity from the high viscosity component occurs and the fiber is less uniformly piece dyeable in the form of a carpet. Preferably, the step ramp taper deviation is about 0.9° to 2° greater than normal taper.

To further assist in the mixing of low and high viscosity components the flight edge in the transition zone facing the feed section has a radius of curvature 23 of ⅜ inch. On the opposite side of the flight the radius of curvature 24 is ½ this value or 3/16 inch. Thus using the combination of step ramps and the above indicated radius of curvature, improved fiber uniformity is obtained. The transition zone radius of curvature on the flight edge in the direction of the feed zone is between 0.25 inch and 0.5 inch. This value divided by the extruder diameter is between 0.070 and 0.14. Within the transition zone on the side of the flight edge toward the metering zone the radius of curvature is between 0.125 and 0.31 inch. This value divided by the extruder diameter is between 0.035 and 0.089.

A smooth transition 26 from the step ramp to the metering zone occurs. Molten polymer passes through flight interruption zones 11A, 12A, and 13A in which mixing rings are present and exits at 15A toward a spinnerette, not shown. A cooling zone 25 may be used and supplementary cooling may be employed in conjunction with heaters in the transition and metering zones. Such cooling means may be pressurized water or heat transfer oils.

Figure 3:
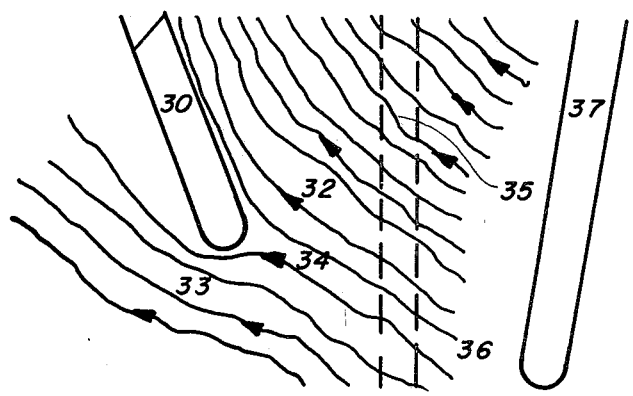
FIG. 3 is a schematic view showing the polymeric flow passing through a conventional mixing ring before encountering the leading edge of the next flight where division of the flow occurs as indicated by the lines. It is this division of flow and change of direction which results in good mixing characteristcs without excessive pressure changes wthin the extruder.

FIG. 3 is a sketch of typical polymeric flow lines which are being admixed by the leading edge of flight 30. The flow lines illustrated are approximately characteristic of the flow lines which can be observed when an extruder screw containing polymer is removed. The teeth or mixing rings at 35 do not significantly mix since the flow lines 36 passing through the mixing teeth do not substantially alter their course. It is only on approaching the leading edge of the flights 30 as indicated at 34 that these flow lines are significantly altered. Utilizing aerodynamic theory, Foundations of Aerodynamics, pp. 64–69 John Wiley & Sons, Inc., New York City (1961 edition), it can be shown that the acceleration of the polymer mix as it passes the flight edge 30 is approximately doubled. If one takes the value found for reduction of particle size in a conventional non-mixing extruder, it can be shown that the particle size is reduced with the increasing shear rates, as determined by the velocity of the screw.

If one takes the theoretical shear rate plus a doubling of the shear rate for the fluid velocity acceleration in passing flight edge 30, this corresponding shear rate closely checks the theoretical particle size reduction and coefficient of particle size variations that one would obtain utilizing a shear value increased by 200 percent. Referring again to FIG. 3, flow lines 32 and 33 illustrate that a minor portion of the flow proceeds on a forward edge of the flight and a major part of the flow proceeds on the back edge of the flight. This also provides for additional mixing operations. The flight edge 37 illustrates the ending of the flight edge of the extruder.

Figure 4:
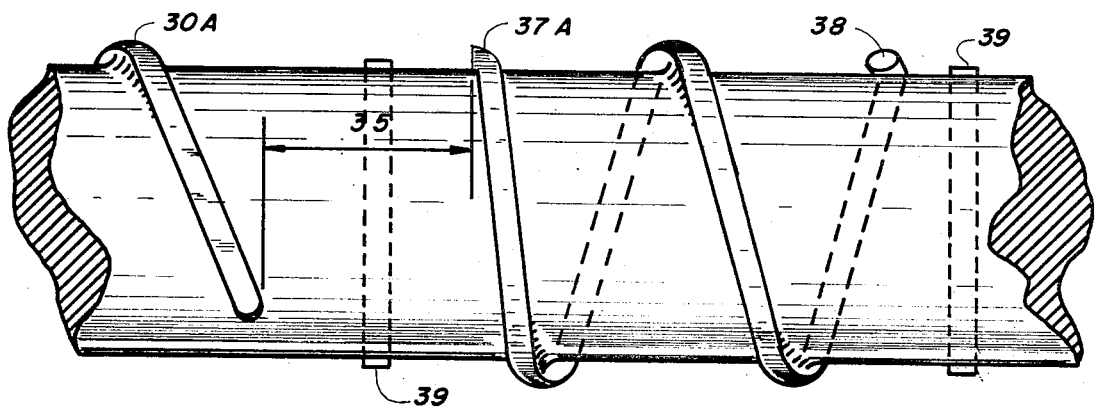
FIG. 4 shows a section within the metering zone and illustrates the flight interruption points within the screw flight and also illustrates the presence of mixing rings.

FIG. 4 is a more detailed drawing of the extruder section wherein the flights edge 30 and flight interruption distance 35A can be observed. The rings 39 within the section 35A may also be observed. The upstream flight edge 37A corresponds to the flight edge 37, FIG. 3, and the lead section 38 at different positions in the screw rotation.

Figure 5:
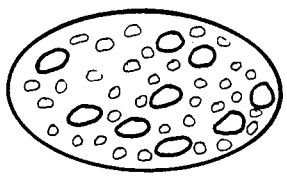
FIG. 5 is a cross section of the extrudate filament of 30 percent polyester and 70 percent polyamide produced employing a conventional mixing screw. It can be observed that the particle sizes which are obtained are comparatively large and quite variable in size.

FIG. 5 is a sketch of a small portion of an extrudate cross section of a 70/30 nylon-polyester ratio polymer blend where the round circles illustrate polyester particles dispersed in a polyamide matrix. This sketch illustrates an extrudate made utilizing a conventional mixing screw. The polyester particle size is 1.80 microns and the standand deviation of polyester particle size variation is approximately 0.635. The number of polyester particles in a 1,000-micron$^2$ drawn cross section is approximately 43,700.

Figure 6:
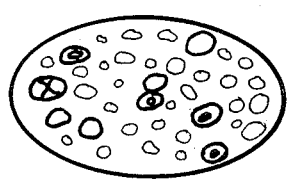
FIG. 6 illustrates a cross section of a 30 percent polyester 70 percent polyamide extrudate filament made with a conventional non-mixing type nylon extruder. Like FIG. 5, there are large particle sizes of the polyester component and considerable variation in the particle size.

FIG. 6 illustrates a 30 percent by weight polyester dispersed in a 70 percent by weight polyamide matrix utilizing a conventional non-mixing nylon screw. In this case, the number of particles in a 1,000-micron$^2$ drawn cross section is 49,800. However, the standard deviation of particle size variation for the extrudate cross section illustrated is 0.0966 which indicates the lack of uniformity characteristic of a non-mixing extruder.

Figure 7:
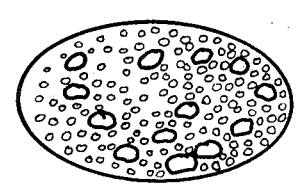
FIG. 7 illustrates a dispersion of the same composition blend of FIGS. 5 and 6 produced from a mixing extruder of the present invention to illustrate the type of dispersion obtained within the extruder. As can be observed, these particle sizes are significantly smaller and are substantially more uniform than those in FIGS. 5 or 6. The particles illustrated in FIGS. 5, 6 and 7 were sketched from a photomicrograph of 1150 magnifications.

FIG. 7 illustrates the type of particle size and type of particle size distribution to be expected in admixing a 30 percent polyester, 70 percent polyamide blend. In this case, there were approximately 113,500 polyester particles per 1,000-micron $^2$ drawn cross section and the standard deviation of particle size variation for the extrudate cross section shown was less than 29 percent. The average polyester particle size was 1.31 microns, in the extrudate as measured from a sample taken just below the spinneret. The remarkable quality of the dispersion and its uniformity is achieved when the critical parameters as to zone length, lead distance and metering heights as outlined in this invention are observed.

DEFINITIONS, FORMULAE AND TESTS

The melt viscosity (poises), as reported, is measured by use of an Instron melt rheometer with 50 mils diameter capillary and 4 inches long. Melt viscosities as reported, are standardized to a temperature of 275° C. and a velocity gradient of 3,000 reciprocal seconds shear rate.

The mixing temperature (° C.), as reported herein, is measured by a thermocouple whose inner wall protrude into the melt at the exit from the extruder. Pressure is reported using a pressure gage in the similar area at the exit from the extruder.

Apparent mixing shear (seconds$^{-1}$) as expressed herein is in terms of shear rate. For a conventional non-interrupted flight screw the mixing shear is given at a formula $D\pi$ (r.p.s.)/$H$ wherein $D$ is a screw diameter, r.p.s. is revolutions per second of the screw and $H$ is the depth of the channel between the screw threads in the metering section of the extruder, in the same units as $D$.

The diameter of polyester particle D in extrudate (microns)—molten filaments are cut a few inches below the spinneret, releasing the take-up tension on the filaments being extruded, and the forward flow of the molten polymer from the spinneret is collected on a tray in a form of relatively thick filaments which quickly solidify on the tray. The average values of these polyester particles can be ascertained employed a Coulter Counter Model A with a 30 micron aperture; or in the case of this invention, they are ascertained at 1250 magnifications in a Microtomed cross section of the extrudate. A grid may be used for measuring average particle size contained within that grid.

Polyester fiber lengths in undrawn yarn (microns)—These lengths as reported herein are averages, measured from photomicrographs of lengthwise section of undrawn yarn stained with a dye for nylon ingredient which does not dye the polyester; e.g:. by immersion in a boiling 0.07 percent aqueous solution of brilliant acid blue dye for one hour.

Polyester fiber lengths (L) drawn yarns (microns)—These lengths (L) are averages calculated by multiplying the fiber length in the undrawn yarn by the draw ratio. These calculated values agree with measured values via electron microscope.

Diameter (D) of polyester fibrils in drawn yarn (microns)—These diameters are too small to be adequately determined with an optical microscope. Average diameter (D) as reported herein is calculated from polyester fibril lengths, L, in the drawn yarn, as above defined, by the formula: $D=(d^3/1.5)^{1/2}$ wherein $d$ is the diameter of polyester particles in the extrudate as above defined. The drawn polyester fibril diameter, thus calculated, has been checked by an electron microscope. The measurements agree within ±0.01 micron.

Number (N) of polyester fibrils/per 1,000 microns of transverse filament.—As reported herein, (N) is calculated from the above defined diameter D of polyester fibrils in drawn yarn by the formula:

$$N = \frac{1000F \times (\text{density of filament})}{(D/2)^2 (\text{density of the fibril})}$$

wherein F is the weight fraction of polyester in the fiber-forming blend and (D) is the above defined fibril diameter. The density of the fibril is that of a drawn polyester, e.g., 1.38 grams/milliliter for polyethylene terephthalates; and the density of the filament is given by 1/F/density of drawn polyester +1-F/density of drawn nylon. These calculated numerical values agree closely with the values obtained by electron microscopic counting of similar dispersions.

Melt density (grams, milliliters)—In calculating volumetric flow rates from the throughput and weight unit per hour, the following values are used for melt densities at 270° C. Nylon 6 polycaproamides—1.01 gms./ml.; polyethylene terephthalate—1.21 gm./ml.; polyethylene terephthalate/nylon 6 blends in rate ratios shown: 10/90—1.03 g./ml.; 20/80—1.05 g./ml.; 30/70—1.07 g./ml.; 40/60—1.09 g./ml.; 50/50—1.11 g./ml.

Lead distance—This is the distance from center to center of the flights as illustrated in FIG. 1, by reference numeral 14.

Lead/diameter ratio—This is the lead distance divided by the screw diameter.

Compression ratios—The depth of the flight in the feed section divided by the depth of the flight in the metering section.

Feed zone compression ratio—This is the feed zone flight depth on the initial flight divided by the flight depth and the initial flight in the transition zone. If there is no rise in the feed zone, this value is unity or 1.0.

Transition zone compression ratio—This is the initial flight depth in the transition zone divded by the flight depth in the metering zone.

Flow velocity in the metering zone—This value is determined in inches/minute by ascertaining the molten flow of polymer in cubic inches then dividing it by a cross section area within a flight in the metering zone, this value in turn being determined by the flight height times the lead distance times 1.

Sigma value or standard deviation of polyester extrudate diameter—This value was determined at 1250 magnifications so the measured microns dividided by 1250 equaled the micron diameter (D) of the polyester dispersed in the extrudate. Thus, sigma equals $$\sqrt{\Sigma D^2/n - [(\Sigma D/n)^2]}$$

where D=diameter of the polyester particles and $n$ is the number of particles measured and $\Sigma$=sums of the test values.

Coefficient of the standard deviation—Equals standard deviation or sigma divided by $\Sigma D/n$ (100%).

Flight radius of curvature—This is the peripheral distance in inches represented for the initial curve from the bottom of extruder channel until it assumes the same angle as the extruder flight.

The following examples further illustrate the invention:

Examples 1–11

A series of extruder screws representing a range of mixing and non-mixing types were constructed and evaluated in the spinning of polycaproamide and 70/30 polycaproamidepolyethylene terephthalate ratio blends.

Pellets of polycaproamide alone in some instances or a mixture of pellets of polycaproamide and polyester all being 0.1 inch by 0.1 inch diameter were fed to the feed zones of the extruder. The extruder had three heating zones with electrical heaters located around the barrel of the extruder, which heat the first zone, extend from the first flight to about 1/3 of the way along the extruder barrel; the second zone terminates 2/3 of the way along the extruder barrel; and the third zone being located at approximately the exit point on the extruder barrel. Generally, the first zone was set at a temperature 10° higher than the other two zones and if excessive mechanical heat was encountered, at the throughput and the extruder revolutions employed, the temperatures established in the second and third zones were in the neighborhood of 240° or generally 20° below that employed for the first zone.

The 3½ inch diameter extruder was tested at about a maximum throughput rate which was 130–140 pounds per hour. Typically, each extruder produced one strand of yarn on each of four positions. As can be observed in Table 1 and Table 1–A, there were wide differences in the temperature fluctuation and pressure fluctuation which were obtained with different geometric constructions of the extruders. Note particularly that only the optimized mixing screw, Examples 7 and 11, gave uniform pressure and temperature results. In the spinning of polycaproamides, Example 1, there were 0.634 drips per position per day from the extruder, as compared with Example 2, where there was approximately 50 percent more drips or 0.965 drips per position per day.

Due to pressure fluctuations the extruder of Example 1 had 0.204 pressure interruptions per extruder day. The extruder of Example 3 had more than three times as many pressure interruptions or equal to 0.678 extruder pressure interruptions per extruder day.

In Example 6 the extruder was constructed similar to the extruder of Example 5 except that the flights were continuous and the mixing rings were interrupted at the extruder flight crossing points. This type of extruder construction resulted in a very narrow range at which pressure conditions were constant. If the throughput rate was changed significantly, pressures fluctuated so violently that such a unit would not be considered of commercial utility in the production of synthetic fibers.

The extruder of Example 8 represents an extruder which gave poor thermal control but relatively low extruder pressure fluctuations. Since it was a non-mixing type, it did not produce satisfactory dispersions of polyester in polyamides.

Thus, as one reviews Tables 1 and 1–A, Examples 7, 11, 12, 13, and 14 were the only extruder types, whether mixing or non-mixing, which produced both uniform temperature and pressure control. By studying the table it can be observed that this particular unit is characterized by a zone length as percent of the total length feed zone, 14 percent; transition zone, 33 percent; and metering zone, 53 percent. We have found that if the feed zone is between 10 and 20 percent of total length, the transition zone is between 27 and 37 percent of the total and the metering zone is between 45 and 60 percent of the total that good thermal performance and good pressure performance can be obtained along with good mixing performance provided the unit has a lead distance and a compression ratio of below 4.0 and above 3, and between 2 and 6 flight interruptions which may or may not be crossed by mixing teeth or similar mixing devices. The important thing is to have the flight interruptions as indicated. Preferably the metering zone flight depth, divided by the diameter of the extruder is between 0.00286 to 0.0030. As can be noted from Table 1–A, the extruder has a low compression ratio in the feed zone and a high compression ratio in the transition zone, this being principally affected by the relative lengths of these two zones.

It is quite exceptional to find a combination of process parameters for obtaining equal pressure and temperature uniformity for a mixing screw as compared with a conventional screw and it is quite unexpected to find a critical combination of process parameters where a mixing screw operates with lower pressure and temperature fluctuations than a non-mixing screw type.

When a mixture of polyester and polyamide was passed through an extruder, the mixing screw in Examples 7, 11, 12, 13 and 14 gave a significantly more uniform product than was obtainable by the extruder representing the other nine units evaluated.

TABLE 1.—EXTRUDER—PHYSICAL DATA

| Ex. No. | Type extruder | L/D, where D=1 [1] | Lead distance (D) | Lead, D/dia. | Compression ratio | Percent open area mix teeth | (L), feed, in. | Transition (L), in. | Metering length, in. | Feed flight depth | Feed zone, compression ratio | Transition flight depth |
|---|---|---|---|---|---|---|---|---|---|---|---|---|
| 1 | Standard nylon screw | 17.2 | 5½ | 1.57 | 4.67 | Non-mix | 42.1 | 5.5 | 12.4 | .438 | 1.74 | .251 |
| 2 | Exp. mixing,[3] | 17.2 | 2¾ | .81 | 4.1 | 49.0, 3 mix rings | 19.8 | 13.1 | 27.1 | .496 | 1.0 | [2].496 |
| 3 | Exp. high capacity | 17.2 | 5½ | 1.57 | 5.32 | Non-mix | 16.5 | 31.1 | 12.4 | .500 | 2.0 | .251 |
| 4 | Exp. high capacity mixing | 17.2 | 5½ | 1.57 | 5.75 | 49.0, 2 mix rings | 22.0 | 25.6 | 12.4 | .550 | 2.20 | .251 |
| 5 | Exp. mixing | 17.2 | 2¾ | .81 | 4.1 | 49.3, 3 mix rings | 19.8 | 13.1 | 27.1 | .496 | 1.0 | [2].496 |
| 6 | Cont. flights extend through the rings | 17.2 | 2¾ | .81 | 4.1 | 49.3, 3 mix rings (not cont.) | 19.8 | 13.1 | 27.1 | .496 | 1.0 | [2].496 |
| 7 | Optimized mixing (this invention) | 17.2 | 2¾ | .81 | 3.53 | 49.3 | 8.4 | 19.7 | 32.3 | .371 | 1.0 | [2].371 |
| 8 | Special modified screw | 17.2 | 3½ | 1.0 | 2.7 | Non-mix | 18.4 | 24.5 | 17.1 | .328 | 1.0 | [2].328 |
| 9 | Standard nylon screw | 16.3 | 5½ | 1.57 | 4.64 | do | 38.8· | 5.5 | 12.5 | .435 | 1.75 | .248 |
| 10 | Standard mixing | 16.3 | 2¾ | .81 | 4.1 | 49.3, 3 mix rings | 16.6 | 13.1 | 27.1 | .496 | 1.0 | [2].496 |
| 11 | Mixing screw with ramp in transition zone (this invention) | 17.2 | 2¾ | .81 | 3.47 | do | 8.4 | 19.7 | 32.3 | .371 | 1.0 | ([7]) |
| 12 | Optimizing mixing | 24.0 | 2¾ | .81 | 3.53 | No mixing rings | 10.0 | 28.0 | 46.0 | .385 | 1.0 | .385 |
| 13 | Step ramp mixing screw | 17.2 | 2¾ | .81 | 3.49 | do | [5] 8.4 | 22.0 | 26.6 | .373 | 1.0 | [4].373 |
| 14 | Large mixing screw [6] | 28.0 | 4¾ | .95 | 3.50 | do | 14.0 | 49.0 | 77.0 | .51 | 1.0 | .51 |

[1] Flights are not interrupted; mixing ring is interrupted.
[2] Constant taper from feed zone.
[3] Extruder screw, Example 2 and Example 5, was identical except the teeth in the mixing ring, Example 5, were square and in Example 2, were narrower at the base than at the top.
[4] Step ramp rise 1° 2 minutes from normal taper of 42 minutes.
[5] Three interrupted flights employed without mixing ring.
[6] 5-inch diameter extruder.
[7] Stepwise ramps, .371.

NOTE.—L=Length.

TABLE 1-A.—EXTRUDER—PHYSICAL DATA

| Ex. No.[1] | Transition zone, compression ratio | Meter flight depth | Apparent shear rate at 60 r.p.m. | | Sum of total theor. shear rate[2] | Comments on effect of mixing pressure uniformity | | Length of extrud., in. | First flight separ. feed from seal wall | Avg. rise per in. transition zone | Transition length, zone, compression per in. | Feed zone length, percent of total | Percent of total | |
|---|---|---|---|---|---|---|---|---|---|---|---|---|---|---|
| | | | Conv. shear rate[2] | Inter. flights rec., secs.[2] | | Temp. range, °C.,[3] | Pres. range, p.s.i.[5] | | | | | | Transition zone | Metering zone |
| 1 | 2.66 | .094 | 116 | | 116 | 13 | 600 | 60.1 | No | .032 | .484 | 70.0 | 9.2 | 30.7 |
| 2 | 4.1 | .121 | 91 | 182 | 273 | 10 | 1,125 | 60.1 | No | .0265 | .314 | 33.1 | 21.8 | 45.2 |
| 3 | 2.67 | .094 | 116 | | 116 | 6 | 500 | 60.1 | No | .0082 | .086 | 27.5 | 21.8 | 20.7 |
| 4 | 2.67 | .094 | 116 | | 116 | 3 | 1,500 | 60.1 | No | .0100 | .104 | 36.5 | 42.7 | 20.7 |
| 5 | 4.1 | .121 | 91 | 182 | 273 | 12 | 1,125 | 60.1 | No | .0287 | .314 | 33.0 | 21.8 | 45.1 |
| 6 | 4.1 | .121 | 91 | 182 | 273 | ([4]) | ([5]) | 60.1 | No | .0287 | .314 | 33.0 | 21.8 | 45.1 |
| 7 | 3.53 | .105 | 105 | 210 | 315 | 6 | 250 | 60.1 | No | .0135 | .180 | 14.0 | 33.0 | 53.0 |
| 8 | 2.71 | .121 | 91 | | 91 | 10 | 200 | 60.1 | No | .0085 | .11 | 30.7 | 41.0 | 25.5 |
| 9 | 2.64 | .094 | 116 | | 116 | Similar to Example 1 | | 56.8 | No | .0297 | .49 | 68.5 | 9.65 | 22.0 |
| 10 | 4.1 | .121 | 91 | 182 | 273 | Similar to Example 5 | | 56.8 | No | .0287 | .315 | 29.3 | 23.0 | 47.7 |
| 11 | 3.47 | .107 | 103 | 206 | 309 | 4 | 200 | 60.1 | Yes | .0132-.037 | [6].158 | 14.0 | 33.0 | 53.0 |
| 12 | 3.60 | .105 | 105 | 210 | 315 | 3 | 150 | 84.0 | No | .0137 | .126 | 11.9 | 33.4 | 54.7 |
| 13 | 3.49 | .107 | 103 | 206 | 309 | 3 | 175 | 60.0 | Yes | .012-.03 | | 14.0 | 36.7 | 49.3 |
| 14 | 3.50 | .145 | [7]109 | 218 | 327 | 2 | 100 | 140.0 | No | .0075 | .0715 | 10.0 | 35.0 | 55.0 |

[1] See Table 1 for type extruder.
[2] Shear rate is expressed in reciprocal seconds.
[3] This is data for a new screw; as the screw wears in service, the temperature fluctuation drops to 7° and the pressure fluctuation drops to 200 p.s.i.g. This occurs only after years of service.
[4] High temperature fluctuation with change in flow.
[5] High pressure fluctuation with change in flow.
[6] Min.=.0197; max.=.053.
[7] Shear rate is based on an extruder r.p.m. of 55.

Examples 15–18

The extruders of Examples 1, 5, 7 and 11 were selected for more extensive evaluations. A blend of 30 percent by weight polyethylene terephthalate (PET) having a melting point of 255° C. by differential thermal analysis (DTA) and about 65° C. by optical observation of disappearance of the crystalline material of this PET. The PET had a melt density of 1.21 gms./ml. at 270° C. and a density of 1.38 grams/ml. in the form of the drawn filaments. The polyester had an ortho-phenol reduced viscosity of 0.80 and a melt viscosity in poises of 2,500 when measured at 270° C. and a shear rate of 3,000 reciprocal seconds.

The nylon employed had a density of about 1.13 grams/cc. and molten density at 270° of 1.01 grams/cc. The nylon employed had a ortho-chlorophenol reduced viscosity of 1.055 and melt viscosity in poises of 1,075.

There were 75 milliequivalent end groups as carboxyl groups and 6 milliequivalent groups as amines per kilogram of polymer.

A blend of 30 percent by weight polyester (polyethylene terephthalate) and 70 percent polyamide (polycaproamide) having a pellet diameter of 0.1 by 0.1 inch in length were blended carefully and then fed to the extruder at the indicated flow rates.

An extruder zone temperature of 265° C. was maintained on the heater band in the first zone; 255° C. in the second zone; and 255° C. in the third zone. The yarn was extruded and pumped through conventional spin packs and then passed through a spinneret having capillaries sized to provide a shear of approximately 10,000 reciprocal seconds. Samples of the extrudate were collected from time to time just below the spinneret face without tension employing conditions under which the polyester particle retained its original circular form of a size and dispersion type as characterized by the action of the extruder mixing screw and the general extrusion operation.

The results of the extrusion tests may be improved in Table 2 where the process effectiveness of an optimized mixing screw, Example 17, as compared with Examples 15 and 16 can be seen. In Example 17, extrudate diameter of 1.31 microns was obtained. The standard deviation of particle size of the extrudate was 0.441, and the variance of the PET particle size in the extrudate was 0.195. Temperature and pressure fluctuations were good to excellent. The calculated diameter of the drawn filaments was 0.064 and the calculated number of polyester particles per drawn cross section was 113,500. The polyester particles were approximately three times greater than that obtained by other mixing screws and non-mixing screws evaluated. The large number of polyester particles improves the fatigue properties of the yarn, improves its elastic properties, and improves its fabric dye uniformity as well as the ability of the fabrics made from this yarn to absorb dyestuffs.

In Example 18 a small improvement was made in extrudate diameter and in the sigma of the extrudate diameter (standard deviation) and in the PET particle size variance in the extrudate. It is quite significant that when the extrudate diameter standard deviation was plotted against logarithm of the apparent shear rate in reciprocal seconds, as indicated in Table 2, that essentially a linear relationship is obtained. However, when Example 18 is placed on the same scale, a less exact correlation is obtained. Therefore, the effect of the step-ramps in the transition zone and the flight curvatures radius as already described for FIG. 2 are not readily explainable with the present state of knowledge in the field of mixing within extruders. However, it is believed that considerable improvements in mixing within a transition zone do occur due to the combination of the step-ramp and the curvature of the flight radius employed.

One factor to note is the ratio of flow velocity within a flight as compared to the tip velocity of the mixing flight edge within the metering zone. It can be speculated that part of the unusually good pressure and thermal characteristics of the screw is a low velocity differential between the tip radius and the laminar velocity of the polymer moving within extruder flights in the metering section which results in smooth mixing rather than turbulence.

The tip radius of the flight edge 30A, FIG. 7, was 0.8. Preferably this should be 0.7 to 0.9 and may range from 0.5 to 1.15. The distance from a flight across the flight interruption within the metering zone for Examples 17 and 18, was ¾ inch. It has been found that this may be decreased to ⅜ inch or increased to 1¼ inch, preferably it should be in the range of ½ inch to 1 inch for a 2 inch to 4 inch extruder.

TABLE 2.—EFFECTIVENESS OF EXTRUDER TYPES IN DISPERSING NYLON-POLYESTER BLENDS

| | Example Number | | | |
|---|---|---|---|---|
| | 15 | 16 | 17 | 18 |
| Type extruder | Conventional nylon non-mixing screw | Conventional mixing screw | Improved mixing screw | Modified mixing screw [1] |
| See Example No. for extruder dimension details | 1 | 5 | 7 | 11 |
| Extruder, r.p.m | 60-62 | 60-63 | 60-63 | 60-63 |
| Approximate apparent shear rate | 116 | 273 | 315 | +310 |
| Laminar flow velocity, in./min. in a flight | 120 | 180 | 212 | 205 |
| Interrupted flight tip velocity, in./min | | 660 | 660 | 660 |
| Interrupted flight velocity/laminar flow velocity | | 3.67 | 3.11 | 3.22 |
| Laminar flow velocity/interrupted flight tip velocity | | .273 | .322 | .31 |
| Extrudate diameter, microns | 1.735 | 1.803 | 1.31 | 1.28 |
| Sigma of extrudate diameter | .61 | .635 | .441 | .40 |
| Variance of extrudate polyester particle size [2] | .367 | .402 | .195 | .185 |
| Pressure and temperature fluctuation | ([3]) | ([4]) | ([5]) | ([5]) |
| Diameter [6] drawn filament, microns | .0966 | .1032 | .064 | .0606 |
| No. of polyester particles [6] per 1,000 microns [7] | 49,800 | 43,700 | 113,500 | 121,500 |

[1] With 1°24' Step Ramps in Transition Zone and Flight Curvature Radius (this invention).
[2] Variance=the mean square of the deviations of the observations from the mean:

$$\text{Variance} = \Sigma \frac{(X_o - \overline{X})^2}{N-1} = X_o = \text{individual observation or data;}$$

$\overline{X}$ = average of data;
$N$ = number of data points.
[3] Fair-to-good.
[4] Poor-to-fair.
[5] Good-to-excellent.
[6] Calculated based on 370 micron (draw ratio 5.8) polyester drawn fibril length and the measured polyester extrudate diameter drawn yarn was 1,140/70 denier.
[7] Within the scope of this experimental data fabric dye uniformity and dye depth are improved with an increase in polyester particles per 1,000 micron drawn filament cross section.

The observed polyester extrudate particle size obtained corresponds to a shear rate in the range of 70 reciprocal seconds to 150 reciprocal seconds when using a non-mixing screw of the type illustrated in Example 15. By plotting this particle size against the log 10 of the shear rates, a linear relationship can be demonstrated. If this linear relationship is extended to include an extrudate diameter of 1.31 microns, the corresponding shear rate is 288 reciprocal seconds. This may be compared with the apparent shear rate as calculated of 315 reciprocal seconds due to the uniform acceleration of the particle around the interrupted flight tip radius.

Examples 19-21

Polycarproamide pellets of 0.1 inch by 0.1 inch having a formic acid relative viscosity of 56 and containing dispersed therein 0.2 percent titanium dioxide are employed. This material was fed to three different extruders of the type employed for Examples 16, 18 and 20. Along with the polycaproamide pellets was metered, into the feed zone, a polyethylene glycol of about 20,000 molecular weight as a low viscosity material of 2 poises at 275° C. in the amount of 3 percent by weight of polycaproamide employed. Additionally, 0.3 percent by weight of a synergistic component 4,4'-butylidene bis(6-tertiary-butyl-m-cresol) was injected into the extruder feed. The polycaproamide was melted and admixed in the extruder under approximately the same conditions as already described in Examples 1 through 11. Yarn comprising 1140/70 denier was produced after drawing at a draw ratio of 4.5. The feed to the extruder was at the rate of 128 pounds/hour.

The spinneret employed had 70 capillaries and each capillary was 24 mils in diameter by 60 mils in length. The result of the improved mixing screw and the improved modified mixing screw as compared with a conventional nylon non-mixing screw in admixing a low viscosity component and a high viscosity component may be observed in Table 3. What is particularly significant from the table is a low coefficient of variation of the antisoiling and antistatic agents and the very significant improvement in dye uniformity which is obtained using the improved mixing screw versus that for a conventional nylon screw. The same table shows that the major part of the carpets produced from polymer prepared in using a conventional nylon screw were unsatisfactory due to streaking when piece dyed because of incomplete mixing of the antistatic and antisoiling component. When employing an improved mixing screw, Example 20, nearly all of the tufted carpets produced tested from good to satisfactory in terms of suitability for piece dyeing. In a few cases, Example 20, the quality could be classified as marginal.

In Example 21, the mixing screw had 1°24' step ramps from the normal extruder tapers in the transition zone which resulted in yarn containing antisoiling agents and antistatic agents uniformly dispersed. The carpets made therefrom when piece dyed with acid dyes were in the range of very good to satisfactory. It can be further noted that a significant reduction in defective yarn produced per day, was accomplished utilizing the improved mixing screws of this invention, and a significant decrease in broken filaments per pound of yarn produced was accomplished These broken filaments in the drawn yarn result in reduced crimping efficiency during the crimping operation.

A series of antistats and antisoiling agents were evaluated which included (Polyethylene glycol M.W. 750) (Carbowax 750); (Polyethylene glycol M.W. 6000) (Carbowax 6000); (Polyethylene glycol M.W. 4000) (Carbowax 4000); (Polyethylene glycol M.W. 20,000) (Carbowax 20,000); Polyethylene glycol capped with lauryl alcohol M.W. approximately 4100; (Seccoterge LA-67); polyethylene glycol capped with oleic alcohol (Lipocol 0-4) (mol. wt. 4200); bisphenol (para,para'-isopropylidene diphenol) plus 200 moles ethylene oxide (15,000 M.W.) supplied by South Eastern Chemical; propylene-polyethylene glycol mixture (Wyandotte Chemical F127); and 50-50 mix of polyethylene glycol capped with lauryl alcohol (Seccoterge LA-67) and decaglycerol. The listed products were effective antistats and antisoiling agents in concentrations of 2-6 percent by weight of polymer. When melt blended with polyamides in the amount of 2-6 percent in the improved mixing apparatus, both with and without step ramps tapering from normal in the transition zone, sufficient uniformity of the fiber was obtained to be uniformly piece-dyed in a tufted carpet. The coefficient of standard deviation of the antisoil agent was less than 9 percent; whereas with conventional mixing extruders, this coefficient of standard deviation was greater than 10 percent.

TABLE 3.—EFFECTIVENESS OF EXTRUDER TYPES IN DISPERSING LOW VISCOSITY ANTISTATIC AND ANTISOILING PRODUCTS IN A THERMOPLASTIC POLYMER OF HIGH VISCOSITY

| | Example number | | |
|---|---|---|---|
| | 19 | 20 | 21 |
| Type extruder | Conventional nylon screw non-mixing | Improved mixing screw | Improved modified mixing screw, plus 5 1° 24' ramps [1] |
| See Example number for extruder dimension details | 1 | 7 | 11 |
| Standard deviation of antisoil agent | 0.055 | 0.027 | 0.018 |
| Coefficient of antisoil agent variation | 11.2 | 8.4 | 6 |
| Percent full packages completed in drawing | 94.5 | 96.5 | 98.0 |
| Drawing wraps/pound | 0.019 | 0.008 | 0.004 |
| Defective yarn/day, pounds | 125 | 25 | 10 |
| Piece dye uniformity in carpets versus dispersion quality | 2.5–4.7 | 1.5–3.0 | 1.0–2.0 |

[1] The flights toward the feed end had a 3/8" radius of curvature and the flights on the opposite side had a radius of curvature of 3/16". The step ramps were in the transition zone and rose across each flight lead 1°24' from the normal taper and returned to the normal extruder taper of 55' on each new flight section, see Figures 4,5 for the details.

NOTE.—Dye uniformity in carpet piece dyeing: 0=Excellent; 1=Very good; 2=Satisfactory; 2.5=Fair; 3.0=Marginal; 4=Not suitable; 5=Not suitable.

When low viscosity components as antisoiling agents were admixed with polycaproamide in the extruder of Example 13, excellent dispersions and uniform pressure and temperature control were obtained. In this case, no mixing rings were employed and the entire mixing action was due to the step ramps, the radius of curvature, and more particularly, to the flight interrputions in the metering zone. This extruder produced fibers suitable for shaping into a tufted carpet was uniformly piece-dyeable.

We claim:
1. A method for melting and simultaneously dispersing at least two viscous materials to get a uniform dispersion wherein one component has a melt viscosity of greater than 300 poises when measured at 275° C. and an apparent shear rate of 3,000 reciprocal seconds, said method comprising the passage of said materials through a heated extruder divided into a feed zone, a transition zone, and a metering zone, the improvement which comprises advancing the material with a worm-type screw through the metering zone under sufficient shear imposed by flight interruptions to produce an extrudate having a discontinuous phase with a coefficient of particle size standard deviation of less than 30 percent by using said extruder screw having
zones of a length expressed as a percent of the total screw length as follows
feed 6 to 14 percent
transition, 18 to 40 percent
metering, 42 to 68 percent
screw flight depth in feed zone of about 0.1 of said screw diameter
transition zone with a compression ratio between about 3 and 4
screw flight height to screw diameter ratio of between about 0.0025 to 0.0035 in said metering section
2 to 6 flight interruptions in said metering zone
length of said flight interruptions of about 0.105 to 0.36 of said screw diameter
tip radius of the flight edge of said screw of about 0.14 to 0.33 of said screw diameter
said transition zone provided with a series of step ramps rising uniformly from the screw at taper of between 0.9 and 2 degrees.

2. The method of claim 1 wherein said screw has a length of 15 to 20 times its diameter, a transition zone of 27 to 40 percent, and a metering zone of 45 to 60 percent.

3. The method of claim 1 wherein said screw has a length 24 to 30 times its diameter.

4. A method for melting and simultaneously dispersing at least two viscous materials to get a uniform dispersion wherein one component has a melt viscosity of greater than 300 poises when measured at 275° C. and an apparent shear rate of 3,000 reciprocal seconds, said method comprising the passage of said materials through a heated extruder divided into a feed zone, a transition zone, and and a metering zone, the improvement which comprises advancing the material with a worm-type screw through the metering zone under sufficient shear imposed by flight interruptions to produce an extrudate having a discontinuous phase with a coefficient of particle size standard deviation of less than 30 percent by using said extruder screw having
zones of a length expressed as a percent of the total screw length as follows
feed, 10 to 20 percent
transition, 18 to 40 percent
metering, 42 to 68 percent
screw flight depth in feed zone of about 0.1 of said screw diameter
transition zone with a compression ratio between about 3 and 4
screw flight height to screw diameter ratio of between about 0.0025 to 0.0035 in said metering section
2 to 6 flight interruptions in said metering zone
length of said flight interruptions of about 0.105 to 0.36 of said screw diameter
tip radius of the flight edge of said screw of about 0.14 to 0.33 of said screw diameter
said transition zone provided with a series of step ramps rising uniformly from the screw at taper of between 0.9 and 2 degrees.

5. The method of claim 4 wherein said screw has a length of 15 to 20 times its diameter, a transition zone of 27 to 40 percent, and a metering zone of 45 to 60 percent.

6. The method of claim 4 wherein said screw has a length 24 to 30 times its diameter.

References Cited

UNITED STATES PATENTS

| 3,295,160 | 1/1967 | Schippers | 425—67 |
| 3,121,914 | 2/1964 | Olson et al. | 264—349 |
| 3,484,507 | 12/1969 | Smith | 264—148 |

ROBERT F. WHITE, Primary Examiner

T. E. BALHOFF, Assistant Examiner

U.S. Cl. X.R.

264—349

UNITED STATES PATENT OFFICE
CERTIFICATE OF CORRECTION

Patent No. 3,767,754         Dated October 23, 1973

Inventor(s)  D. P. MANNING ET AL.

It is certified that error appears in the above-identified patent and that said Letters Patent are hereby corrected as shown below:

Column 3, line 20, "antisats" should be --antistats--.

Column 4, line 26, "essentially" should be --essential--.

Column 4, line 29, "int he" should be --in the--.

Column 4, line 40, insert --no-- after "length".

Column 6, line 54, "30" should be --30A--.

Column 7, line 25, "protrude" should be --protrudes--.

Column 7, line 44, "employed" should be --employing--.

Column 7, line 53, "section" should be --sections--.

Column 7, line 68, "$D=(d^3/1.5)^{1/2}$" should be --$D=(d^3/1.5L)^{1/2}$--.

Column 11, line 37, "65°C" should be --265°C--.

Column 14, line 56, "0-4)" should be --0-40)--.

Signed and sealed this 26th day of March 1974.

(SEAL)
Attest:

EDWARD M. FLETCHER, JR.
Attesting Officer

C. MARSHALL DANN
Commissioner of Patents